United States Patent
Harada et al.

(10) Patent No.: US 8,155,517 B2
(45) Date of Patent: Apr. 10, 2012

(54) OPTICAL PACKET SWITCHING APPARATUS

(75) Inventors: Keisuke Harada, Fukuoka (JP); Yutaka Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 393 days.

(21) Appl. No.: 12/578,021

(22) Filed: Oct. 13, 2009

(65) Prior Publication Data

US 2010/0027992 A1 Feb. 4, 2010

Related U.S. Application Data

(63) Continuation of application No. PCT/JP2007/059306, filed on May 1, 2007.

(51) Int. Cl.
*H04B 10/00* (2006.01)
(52) U.S. Cl. .......................................... 398/19
(58) Field of Classification Search .................... 398/19, 398/45, 166
See application file for complete search history.

(56) References Cited

U.S. PATENT DOCUMENTS

| | | |
|---|---|---|
| 5,717,510 A | 2/1998 | Ishikawa et al. |
| 5,754,322 A | 5/1998 | Ishikawa et al. |
| 5,760,937 A | 6/1998 | Ishikawa et al. |
| 5,815,294 A | 9/1998 | Ishikawa et al. |
| 5,870,213 A | 2/1999 | Ishikawa et al. |
| 5,896,217 A | 4/1999 | Ishikawa et al. |
| 5,909,297 A | 6/1999 | Ishikawa et al. |
| 5,991,477 A | 11/1999 | Ishikawa et al. |
| 6,229,631 B1 | 5/2001 | Sato et al. |
| 6,295,147 B1 | 9/2001 | Yamane et al. |
| 6,496,288 B2 | 12/2002 | Yamane et al. |
| 6,862,380 B2 * | 3/2005 | Chaudhuri et al. ............. 385/17 |
| 7,079,771 B2 | 7/2006 | Yamane et al. |

FOREIGN PATENT DOCUMENTS

| | | |
|---|---|---|
| JP | 11-8590 | 1/1999 |
| JP | 11-122220 | 4/1999 |
| JP | 2002-26947 | 1/2002 |
| JP | 2005-269668 | 9/2005 |

OTHER PUBLICATIONS

International Search Report dated Jun. 12, 2007, from the corresponding International Application.
International Preliminary Report on Patentability and Written Opinion of the International Searching Authority dated Nov. 24, 2009.

* cited by examiner

*Primary Examiner* — Leslie Pascal
(74) *Attorney, Agent, or Firm* — Katten Muchin Rosenman LLP

(57) ABSTRACT

An optical packet switching apparatus includes plural optical switches, an optical switching section that switches a path of an optical packet transmitted thereto according to the switch control signal to output the optical packet, and a control section that takes out a header portion representing a destination of the optical packet transmitted, photoelectrically converts the header to generate the switch control signal according to the destination to transmit the switch control signal to the optical switching section and controls the optical switch. The apparatus further includes a light monitor section that monitors a light quantity level of the optical packet transmitted and a light quantity level of the optical packet to be sent out, and an abnormality recognizing section that recognizes an effective timing of monitoring of the light quantity levels based on the switching control signal, and recognizes an abnormality based on the light quantity levels at the timing.

5 Claims, 11 Drawing Sheets

OPTICAL PACKET SWITCHING APPARATUS

CROSS-REFERENCE TO RELATED APPLICATION

This is a continuation application of PCT/JP2007/059306, filed on May 1, 2007.

FIELD

The present invention relates to an optical packet switching apparatus which transmits an optical packet transmitted thereto to a destination of the optical packet by switching a path.

BACKGROUND

In order to avoid the bottleneck (limits of bandwidth, signal amount) of the electrical wiring techniques in signal switching in a high speed router, applying an optical packet switch utilizing the high bandwidth characteristics of optical transmission techniques has been studied, and the optical packet switch has been partially introduced. The optical packet switch system which has been introduced so far, once converts an optical signal to an electrical signal to perform switching. Thus, as the bandwidth has been increased, a scale of switch has been expanded. In order to avoid a drastic expansion of the scale of switch, an optical packet switching apparatus which switches an optical packet inputted thereto and sends out the optical packet as it is without converting the optical packet inputted to an electrical signal has been thought.

FIG. 1 illustrates an example of an optical packet switching apparatus that is conventionally thought.

The optical packet switching apparatus illustrated in FIG. 1 is a simplified optical packet switching apparatus for the easiness of illustration and description, and includes an input system of two channels and an output system of two channels.

The optical packet switching apparatus 10 illustrated in FIG. 1 includes an optical packet transmission section (OPTS) 20, an optical switch section (OSS) 30, an optical monitor section (OMS) 40, a control section (CTLS) 50 and a center section (CS) 60.

The optical packet transmission section (OPTS) 20 includes two channels of optical transmission lines 211, 212 on the input side from which optical packets 701, 702 are inputted respectively. The optical packets 701, 702 inputted from the respective optical transmission lines 211, 212 are separated to headers 701a, 702a which include destinations and data information (payloads 701b and 702b) which is main bodies of the optical packets 701, 702. The headers 701a, 702a and the payloads 702b, 702b of the optical packets 701, 702 are different in the optical wavelength from each other. Optical filters (OF) 221, 222 separate the optical packets 701, 702 into the headers 701a, 702a and the payloads 701b, 702b, by using a difference of the wavelength.

The headers 701a, 702a of the optical packets 701, 702 are converted into electrical signals by photo detectors (PD) 511, 512 for the respective channels provided in the control section (CTLS) 50 to be inputted to an enable signal generation section (ESGS) 513.

In the enable signal generation section (ESGS) 513, according to destination information written in the headers 701a, 702a, an enable signal for switching plural optical switches (described later) included in an optical switching circuit (OSC) 30 provided in the optical switch section (OSS) 30 is generated to be inputted through six of signal transmission lines 514-1, 514-2, 514-3, 514-4, 514-5, 514-6 to the optical switching circuit.

In contrast, the payloads 701b, 702b separated by the optical filter (OF) 221, 222 are inputted to the optical switch circuit (OSC) 31 of the optical switch section (OSS) 30.

FIG. 2 is a block diagram illustrating a configuration of an optical switching circuit illustrated as one block in FIG. 1.

The optical switching circuit (OSC) 31 includes two of input ports 311, 312, two of photo couplers 321, 322, two of optical switch modules 331, 332 and two of output ports 341, 342. In addition, the two of optical switch modules 331, 332 each includes two upstream side optical switches 331_1, 331_2 and 332_1, 332_2, one photo couple 331_1 and 332_3, and one downstream side optical switches 331_4 and 332_4, respectively.

When an optical packet is inputted from the input port 311 of a first channel, the optical packet is divided into two pieces by the photo coupler 321 to be inputted to the optical switch 331-1 of the first channel and the optical switch (OSW) 332_1 of a second channel on the upstream side. And, similar to this, when an optical packet is inputted from the input port 312 of a second channel, the optical packet is divided into two pieces by the photo coupler 322 to be inputted to the optical switch 331-2 of the first channel and the optical switch 332_2 of the second channel on the upstream side. The optical packets each inputted to the two optical switches 331_1, 331_2 of the first channel respectively are, via each of the optical switches 331_1, 331_2 when the optical switches 331_1, 331_2 are in the on state, further via the photo coupler 331_3, and furthermore via the optical switch 331_4 when the optical switch 331_4 on the downstream side is on, outputted from the output port 341 of the first channel.

In addition, similar to this, the optical packets each inputted to the two optical switches (OSW) 332_1, 332_2 of the second channel respectively are, via each of the optical switches 332_1, 332_2 when the optical switches 332_1, 332_2 are in the on state, further via the photo coupler 332_2, and furthermore via the optical switch 332_4 when the optical switch 332_4 on the downstream side is in the on state, outputted from the output port 342 of the second channel.

Thus, when the first optical switch (OSW) 331_1 on the input side of the first channel and the optical switch (OSW) 331_4 on the output side of the first channel are in the on state, and the second optical switch (OSW) 331_2 of the first channel is in the off state, the optical packet inputted from the input port 311 of the first channel is outputted from the output port 341 of the first channel. When the second optical switch 331_2 on the input side of the first channel and the optical switch (OSW) 331_4 on the output side of the first channel are in the on state, and the first optical switch 331_1 of the first channel is in the off state, the optical packet inputted from the input port 312 of the second channel is outputted from the output port 341 of the first channel.

In addition, regarding the second channel, similar to the first channel, when the first optical switch (OSW) 332_1 on the input side of the second channel and the optical switch (OSW) 332_4 on the output side of the second channel are on the on state, and the second optical switch (OSW) 332_2 on the input side of the second channel are in the on state, the packet inputted from the input port 311 of the first channel is outputted from the output port 342 of the second channel. When the second optical switch (OSW) 332_2 and the first optical switch 332_1 on the input side of the second channel is in the off state, the optical packet inputted form the input port 312 of the second channel is outputted form the output port 342 of the second channel.

As described above, the optical switching circuit (OSC) 31 includes two of the input ports 311, 312 and two of the output ports 341, 342, and may output the optical packet inputted from either one of the input ports 311, 312, from either one of the two of the output ports 341, 342.

In addition, the optical switches (OSW) 331_1, 331_2, 331_4, 332_1, 332_2, 332_4 are connected to six of signal transmission lines 514_1, 514_2, 514_3, 514_4, 514_5, 514_6 which extend from the enable signal generation section (ESGS) 513 illustrated in FIG. 1, respectively. On-off of the respective optical switches (OSW) 331_1, 331_2, 331_4, 332_1, 332_2, 332_4 is controlled, by the respective enable signals transmitted through the signal transmission lines 514_1, 514_2, 514_3, 514_4, 514_5, 514_6.

Note that in order to simplify the description, the example in which the output ports are provided two each has been described, however, a case where an optical switching circuit having more input ports or output ports is similar to the example.

Returning to FIG. 1, the description about the optical packet switching circuit 10 of FIG. 1 will be continued.

The optical packets outputted from each of the output ports 341, 342 of the optical switching circuit (OSC) 31 are transmitted through two optical transmission lines 351, 352 on the output side, respectively.

Note that although the optical transmission lines 351, 352 on the output side in FIG. 1 (and in other figures described later) are illustrated as outputting only the payloads 701b, 702b of the optical packets 701, 702, actually, new headers are added to the respective payloads 701b, 702b to be outputted by a configuration not illustrated here.

The optical monitor section (OMS) 40 is provided with two input side photo detectors (IPD) 411, 412, where respective light quantities of the optical packets (payloads 701b, 702b) for the two channels inputted to the optical switch section (OSS) 30 are detected. Light quantity monitor signals detected by the two input side photo detectors (IPD) 411, 412 are converted to input monitor values as digital signals by the A/D converter 42, and are inputted to an input level monitor circuit (ILMC) 515 included in the control section (CTLS) 50.

Similar to this, the optical monitor section (OMS) 40 is provided with two output side photo detectors (OPD) 431, 432, where light quantities of the optical packets (payloads 701b, 702b) for the two channels outputted from the optical switch section (OSS) 30 are detected. Light quantity monitor signals detected by the two output side photo detectors (OPD) 431, 432 are converted to output monitor values as digital signals by the A/D converter 44, and are inputted to an output level monitor circuit (OLMC) 516 included in the control section (CTLS) 50.

Input level specification values (upper limit value and lower limit value) of the input side optical packet and output level specification values (upper limit value and lower limit value) of the output side optical packet are stored in a register section (RGS) 517 provided in the control section (CTLS) 50. The input level specification values are inputted to the input level monitor circuit (ILMC) 515 and the output level specification values are inputted to the output level monitor circuit (OLMC) 516.

In the input level monitor circuit (ILMC) 515, the input monitor value of the input side optical packet inputted from the A/D converter 42 is compared with the input level monitor value received from the register section (RGS) 517 and a comparison result is transmitted to the center section (CS) 60.

Similar to this, in the output level monitor circuit (OLMC) 516, the output monitor value of the output side optical packet inputted from the A/D converter 44 is compared with the output level specification value received from the register section (RGS) 517, and a comparison result is transmitted to the center section 60.

The center section (CS) 60 includes an alarm calculation block which collects monitor results in each section to be recorded and outputs an alarm.

Note that although the center section 60 is illustrated here as being provided in a single optical packet switching apparatus 10, single of the center section may be provided for whole plural optical packet switching apparatuses and my be integrally play a role to collect the monitor result and to output the alarm in the plural optical packet switching apparatuses.

When the optical packet switching apparatus 10 as illustrated in FIG. 1 is thought, although it is determined that whether or not the optical quantities of the optical packet on the input side and the optical packet on the output side are satisfied with the references is monitored in the input level monitor circuit (ILMC) 515 and the output level monitor circuit (OLMC) 516, for the configuration illustrated in FIG. 1 as it is, it is not known whether it is a timing when the optical packet is currently inputted, and it is not known in what on-off state the optical switches included in the optical switching circuit (OSC) 31 are and through what path the current detected optical packet has passed, and there is a problem that it is difficult to determine whether or not an abnormality occurs. In addition, even though it is determined that an abnormality has occurred, there is a problem that it is difficult to specify whether or not the abnormality is in an optical path or the abnormality is in the detection system for detecting whether or not there is an abnormality.

Here, in Japanese Patent Application Laid-open, No. H11-122220, there is disclosed a technique to detect an abnormality of an output level of an optical signal at plural places while the application field is different. However, the technique disclosed in Japanese Patent Application Laid-open, No. H11-122220 also has a problem similar to that explained referring to FIG. 1, considering that the application filed of the technique is changed to be applied to an optical packet switching apparatus.

In addition, in Japanese Patent Application Laid-open No. H11-8590, there is proposed a technique to control states of plural apparatuses included in an optical transmission system.

Further, in Japanese Patent Application Laid-open No. 2005-269668, there is proposed a technique to stabilize a phase of a control signal of an optical switch that demultiplexes an optical multiplexed signal.

However, the detection ways described in Japanese Patent Application Laid-open No. H11-8590 and Japanese Patent Application Laid-open No. 2005-269668 may not be applied to an optical packet switching apparatus.

In view of the foregoing, it is an object of the present invention to provide an optical packet switching apparatus including means of monitoring that readily detects an abnormality.

SUMMARY

According to an aspect of the invention, 1. an optical packet switching apparatus inlcudes:

an optical switching section that includes an optical switch to switch a path of an optical packet according to an electrical switch control signal, switches the path of the optical packet transmitted thereto according to the switch control signal to output the optical packet;

a control section that takes out a header portion representing a destination of the optical packet transmitted thereto, photoelectrically converts the header to generate the switch control signal according to the destination so as to transmit the switch control signal to the optical switching section, and controls the optical switch;

a light monitor section that monitors a first light quantity level which is a light quantity level of the optical packet transmitted thereto and a second light quantity level which is a light quantity level of the optical packet to be sent out; and an abnormality recognizing section that recognizes an effective timing of monitoring of the first light quantity level and the second light quantity level based on the switching control signal, and recognizes an abnormality based on the first light quantity level and the second light quantity level at the timing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates a timing chart at the time when an automatic enable control signal is on;

DESCRIPTION OF EMBODIMENTS

As follows, exemplary embodiments of the invention will be explained.

Figure 3:
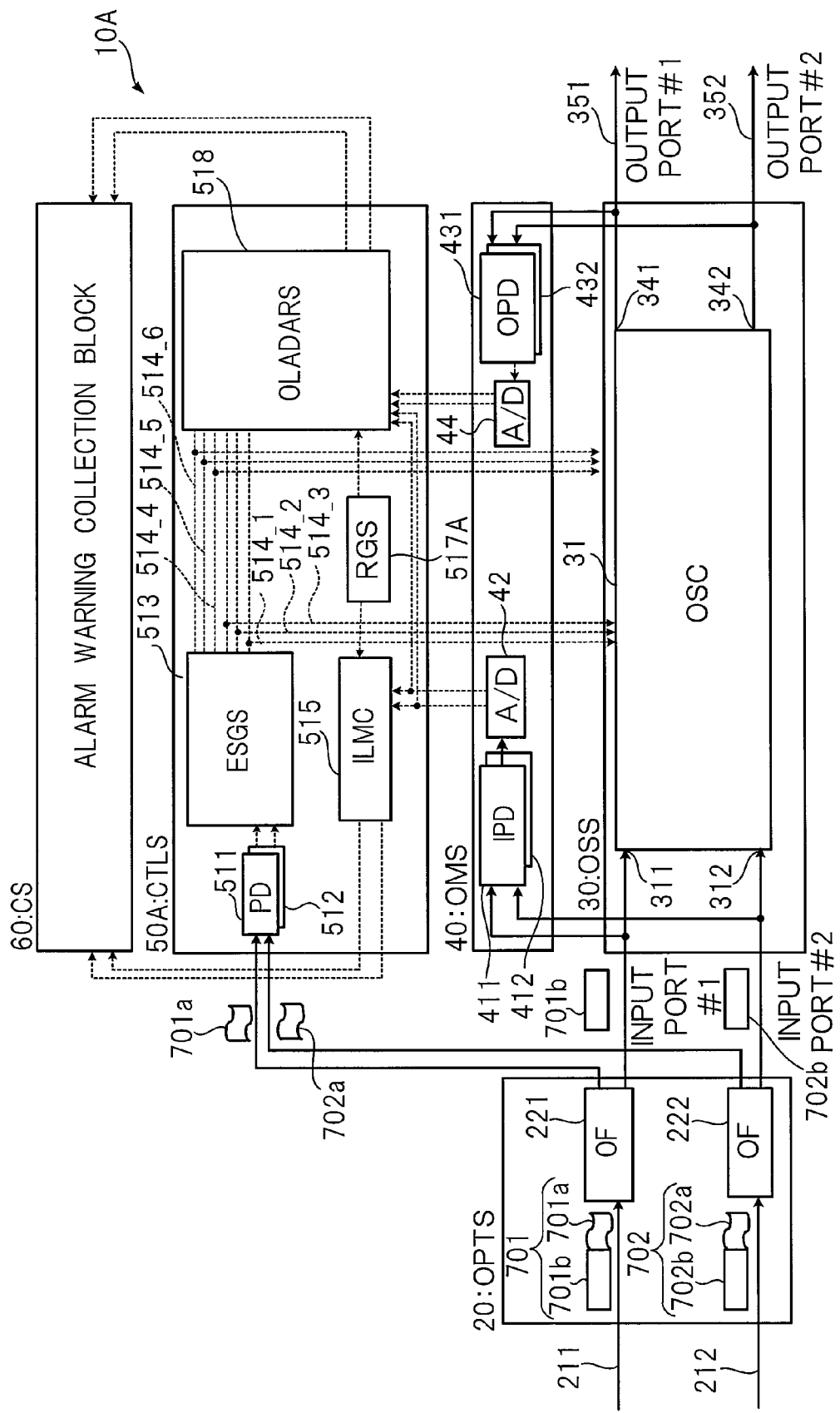
FIG. 3 is a block diagram illustrating an optical packet switching apparatus of a first embodiment according to the invention.

FIG. 3 is a block diagram illustrating an optical packet switching apparatus of a first embodiment according to the invention.

In FIG. 3, elements same as those of the optical packet switching apparatus 10 in FIG. 1 described above are marked with the same references as those in FIG. 1 and only different points will be explained.

Figure 1:
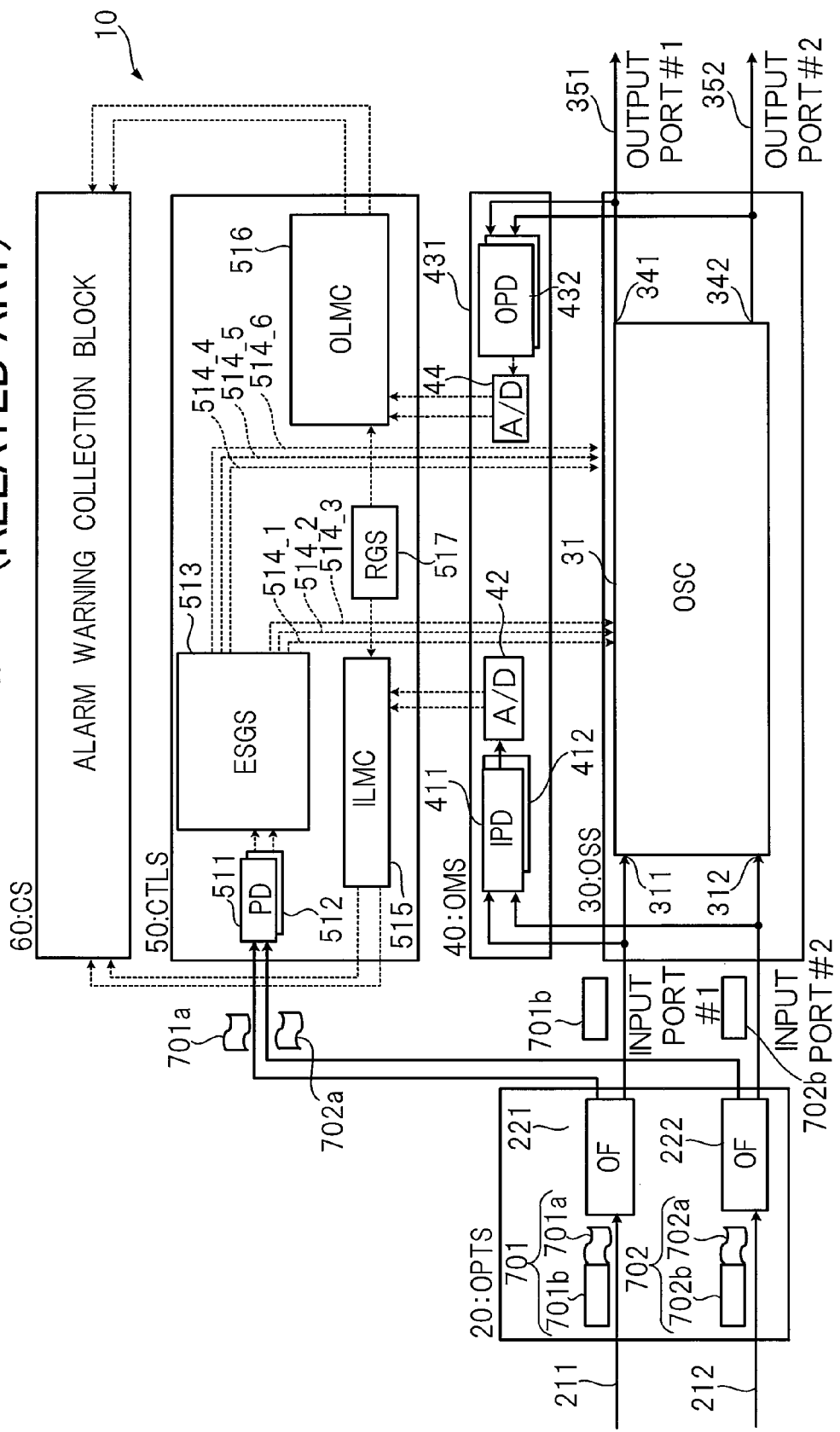
FIG. 1 is a diagram illustrating an example of an optical switching apparatus conventionally thought.

The different points of the optical packet switching apparatus 10A illustrated in FIG. 3 from the optical packet switching apparatus 10 illustrated in FIG. 1 exist in a control section (CTLS) 50A. The control section (CTLS) 50A is provided with an output level abnormality/device abnormality recognizing section (OLADARS) 518 instead of an output level monitoring section of the control section (CTLS) 50 in FIG. 1, and a register section (RGS) 517A instead of the register section (RGS) 517 in FIG. 1.

The register section (RGS) 517 in FIG. 1 stores input level specification values (upper limit value and lower limit value) which are light quantities of an input optical packet in an input level monitoring circuit 515 and output level specification values (upper limit value and lower limit value) which are references of light quantities of an output packet in an output level monitoring circuit 516. In contrast, the register section (RGS) 517A illustrated in FIG. 3 stores a loss reference value which is a specification value of the light quantity loss while the optical packet passes through the optical switching circuit (OSC) 31 in addition to the input level specification values (upper limit value and lower limit value) and the output level specification values (upper limit value and lower limit value). The loss reference value is a value in which a loss of the optical coupler when the optical coupler is in normality, a loss of the optical switch when the optical coupler is in normal, a loss of the optical fiber connecting them when the optical fibers are in normality and the like are considered. From the register section (RGS) 517A, the input level specification values are inputted to the input level monitor circuit (ILMC) 515, and both of the output level specification values and the loss reference value are inputted to the output level abnormality/device abnormality recognizing section (OLADARS) 518.

In addition, an input monitor value representing a light quantity of an input optical packet from an A/D converter 42, an output monitor value representing a light quantity of an output packet from the A/D converter 44 and enable signals from the enable signal generation section (ESGS) 513, being equivalent to the enable signals outputted to six of the signal transmission lines 514_1, 514_2, 514_3, 514_4, 514_5, 514_6, in addition to the output level specification values and the loss reference values, are inputted to the output level abnormality/device abnormality recognizing section (OLADARS) 518.

Figure 4:
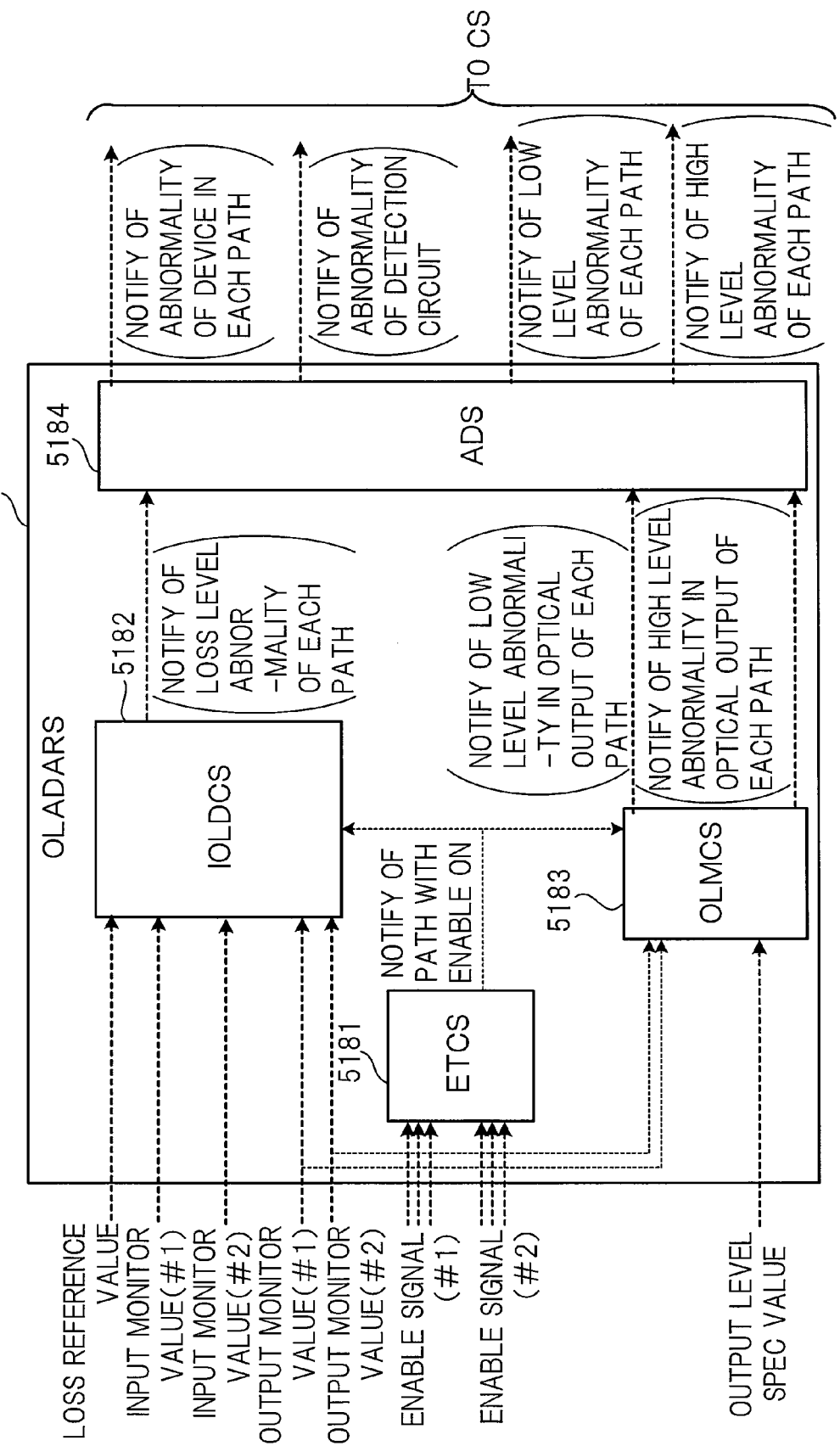
FIG. 4 is a block diagram illustrating an internal configuration of an output level abnormality/device abnormality recognizing section (OLADARS) 518 illustrated as one block in FIG. 3.

FIG. 4 is a block diagram illustrating an internal configuration of an output level abnormality/device abnormality recognizing section (OLADARS) 518 illustrated as one block in FIG. 3.

The output level abnormality/device abnormality recognizing section (OLADARS) 518 is provided with an enable timing check section (ETCS) 5181, an input output level difference check section (IOLDCS) 5182, an output level monitor circuit section (OLMCS) 5183 and an alarm determination section (ADS) 5184.

Figure 11:
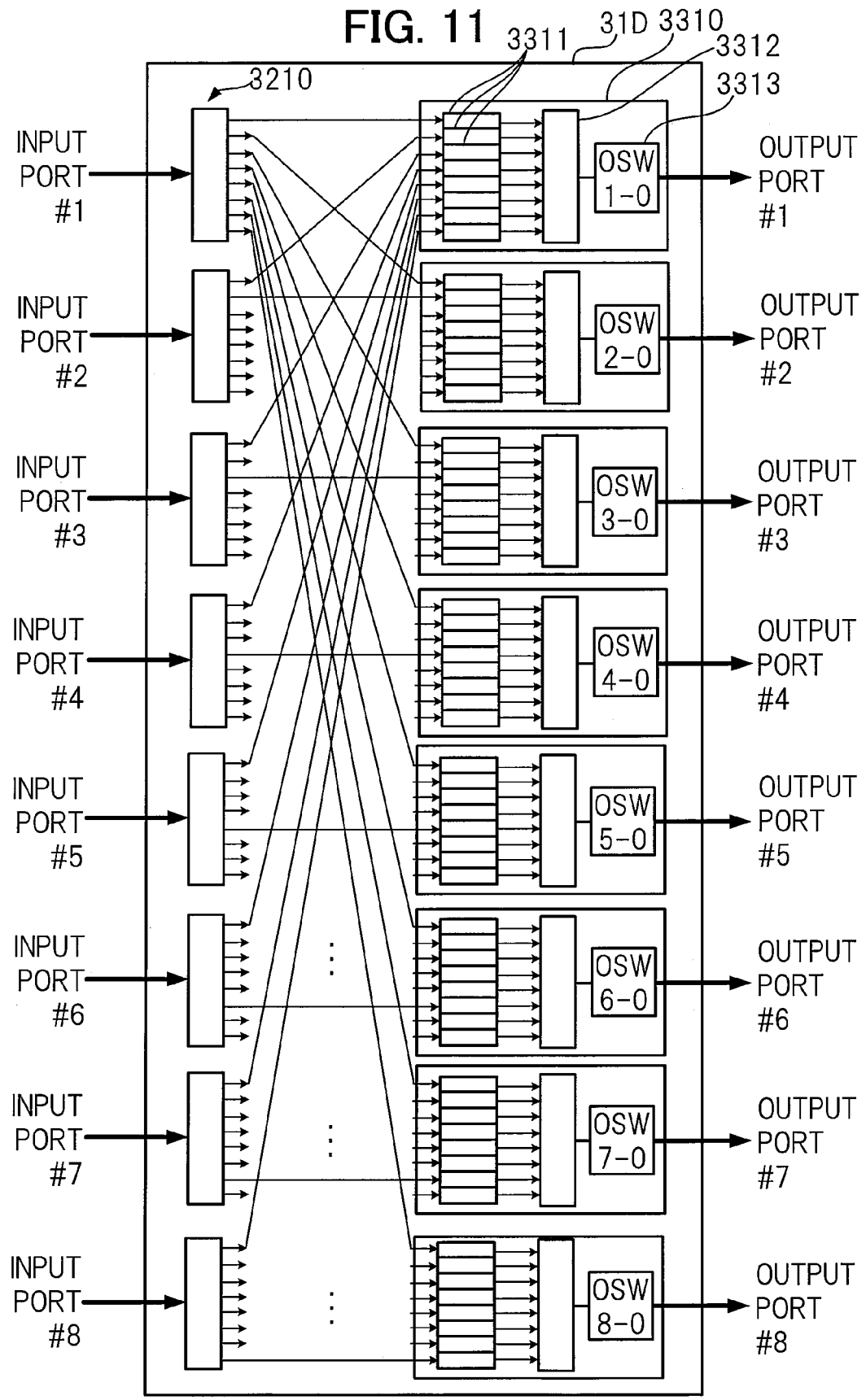
FIG. 11 is a block diagram illustrating an optical switching circuit of multiple channels.

Enable signals to switch on-off of total six of the optical switches (OSW) 331_1, 331_2, 331_4, 332_1, 332_2, 332_4, three each of the them being provided in the optical switch modules 331, 332 of two channels illustrated in FIG. 11, respectively, are inputted to the enable timing check section (ETCS) 5181 from the enable signal generating section 513. An enable-on duration of each path is detected as a check effective timing according to a combination of those enable signals in the enable timing check section 5181. In the input output level difference check section 5182, the input monitor values for two channels from the A/D converter 42, the output monitor values for two channels from the A/D converter 44 and the loss reference value from the register section (RGS)

517A are inputted, calculation of differences between the input monitor values and output monitor values is performed with respect to a path through which an effective packet from the enable timing check section 5181 passes, differences of the monitor values between the input port and the output port for each combination of the input port and the output ports are measured. Difference values as the result of this are compared with the loss reference values, and if the difference values are smaller than the reference values, it is determined that the device of the measurement path measured from the input port to the output port is in normality, and if the difference values are greater than the loss reference values, it is determined that the device of the measurement path is in abnormality, informing the abnormality determination section 5184.

In addition, in the output level monitor circuit section (OLMCS) 5183, the output monitor values for two channels from the A/D converter 44 and the output level specification values (upper limit value and lower limit value) from the register section (RGS) 517A are inputted, and a timing when an effective optical packet is outputted from each of the output ports from the enable timing check section 5181 is captured so that the output monitor values for the optical packet outputted from each of the output ports and the output level specification values are compared to be checked, and in a case where the output monitor values are greater than the upper value of the output level specification values, it is determined to be in a high level abnormality, in a case where the output monitor value intermediate between the upper limit value and the lower limit value, it is determined to be in a normality, and in a case where the output monitor values are smaller that the lower limit value, it is determined to be in a low level abnormality, informing the alarm determination section 5184.

Information about whether or not there is an abnormality of the loss level in each of the paths informed from the input output level difference check section 5182 and information about the high level abnormality, low level abnormality and normality of the optical output of each of the paths informed from the output level monitor circuit section (OLMCS) 5183 are considered in a comprehensive manner to determine whether or not there is an abnormality as a whole and what the abnormal place is, and the result is informed to the center section 60.

Figure 5:
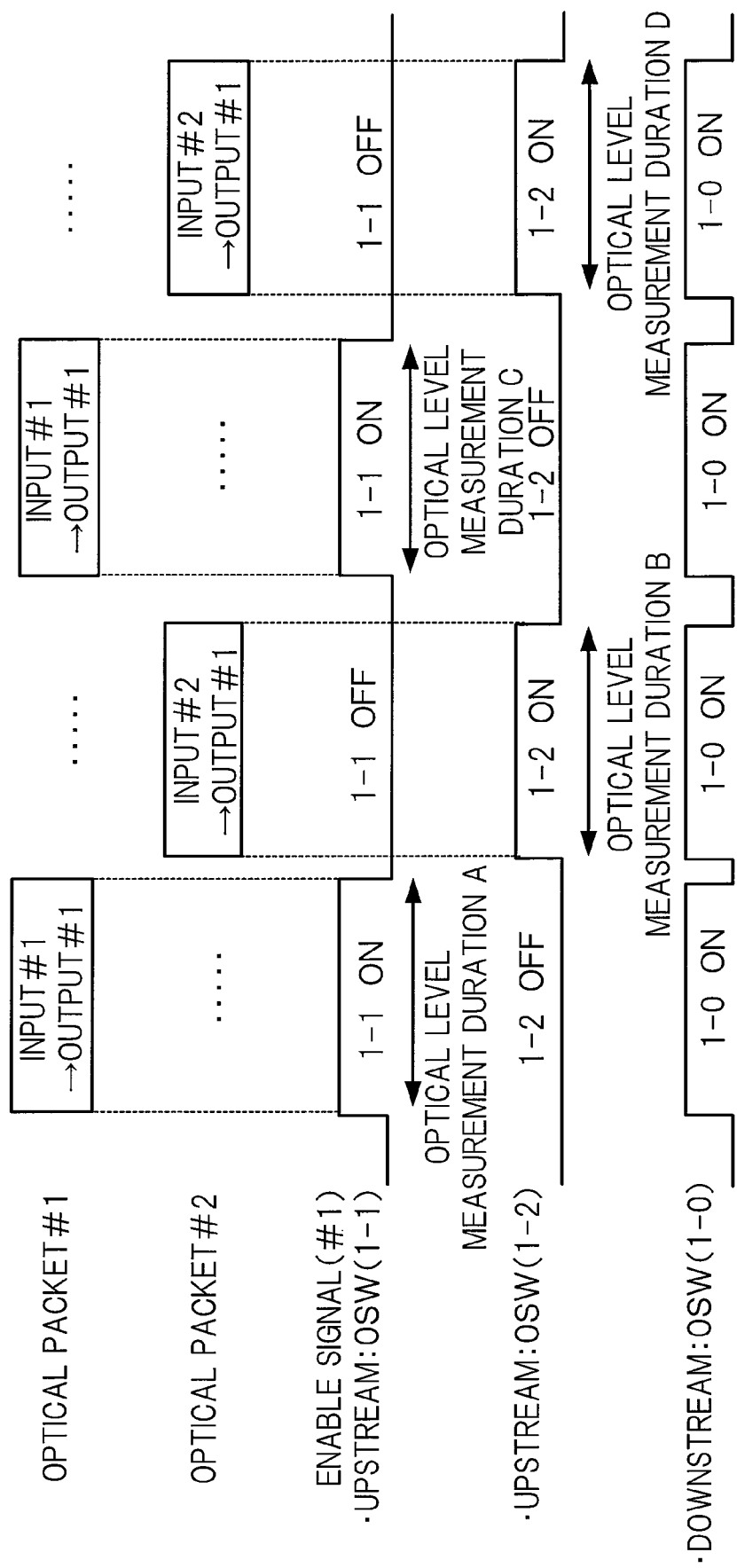
FIG. 5 is a diagram illustrating a relation between a passing timing of the optical packet and on-off of the an enable signal at the output port of the first channel.

FIG. 5 is a diagram illustrating a relation between a passing timing of the optical packet and on-off of the an enable signal at the output port of the first channel.

Figure 2:
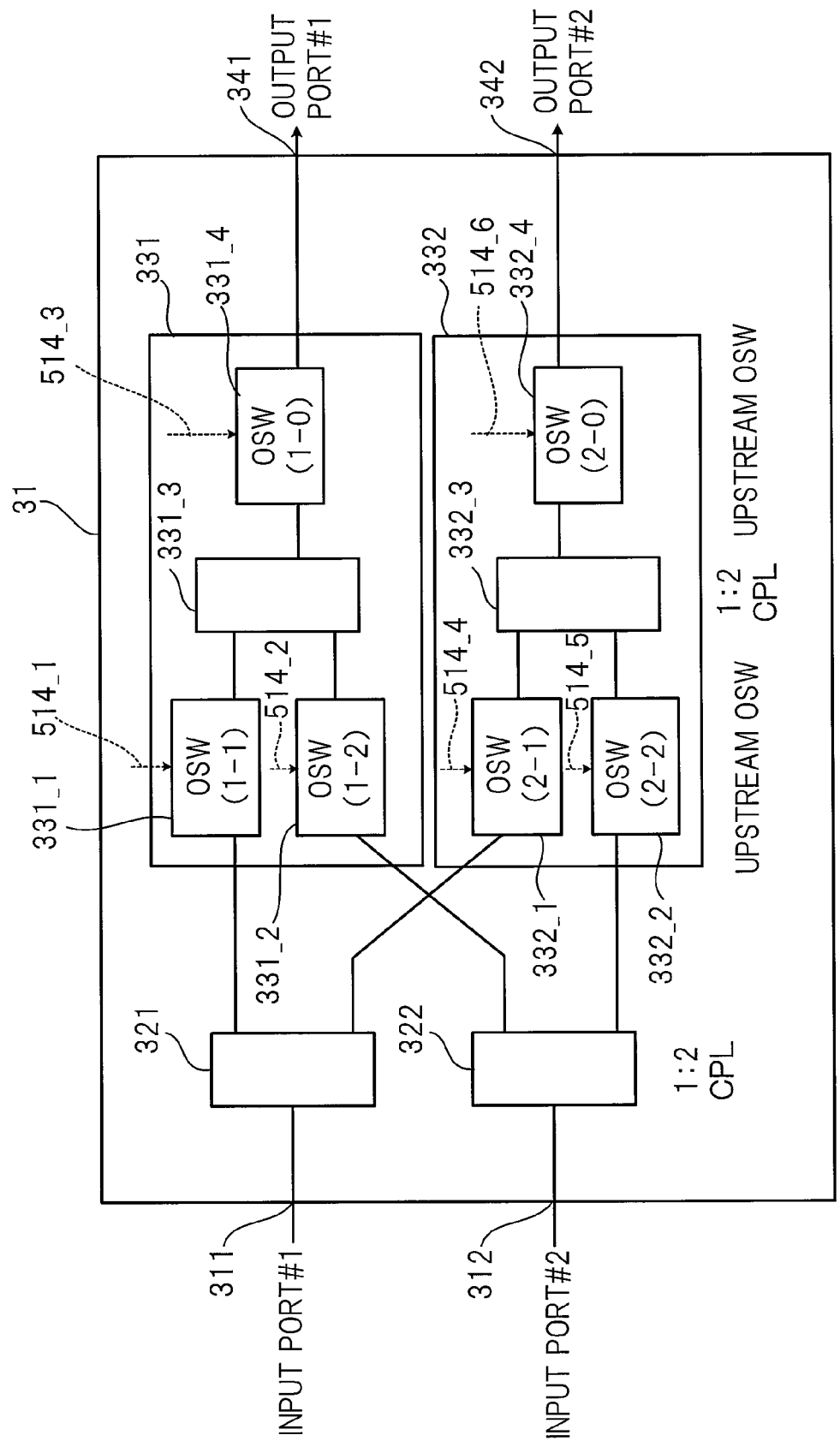
FIG. 2 is a block diagram illustrating a configuration of an optical switching circuit illustrated as one block in FIG. 1.

In an optical level measurement duration A where the optical switch (OSW) 331_1 (upstream: optical SW(1-1)) is on, the optical switch (OSW) 331_2 (upstream: optical SW(1-2) is off and the optical switch (OSW) 331_4(downstream: optical SW(1-0) is on, of the three optical switches (OSW) 331_1, 331_2, 331_4, included in the optical switch module of the first channel illustrated in FIG. 2, an optical packet inputted from the input port 311 of the first channel is outputted from the output port 341 of the first channel. Accordingly, in the input-output level difference check section 5182 of the output level abnormality/device abnormality recognizing section (OLADARS) 518 illustrated in FIG. 4, a difference between the input monitor value representing a light quantity of the light packet inputted from the input port 311 of the first channel and the output monitor value representing a light quantity of the light packet outputted from the output port 341 of the first channel is obtained to be compared with the loss reference value and it is determined whether or not there is a level abnormality. In the output level monitor circuit section (OLMCS) 5183, the output monitor value representing a light quantity of the optical packet outputted from the output port 341 of the first channel and the output level specification values (upper limit value and lower limit value) are compared, and the high level abnormality, normality and low level abnormality are determined.

Further, in the next optical level measurement duration B, by the enable signals, the optical switch (OSW) 331_1 (upstream: optical SW(1-1)) is off, the optical switch (OSW) 331_2 (upstream: optical SW(1-2)) is on and the optical switch (OSW) 331_4 (downstream: optical SW(1-0)) is on. In this optical level measurement duration B, the optical packet inputted from the input port 312 of the second channel is outputted from the output port 341 of the first channel. Accordingly, a difference between the input monitor values representing a light quantity of the optical packet inputted from the input port 312 of the second channel and the output monitor value representing a light quantity of the optical packet outputted from the output port 341 of the first channel is obtained to be compared with the loss reference value and to be determined whether or not there is a level abnormality. In the output level monitor circuit section (OLMCS) 5183, the output monitor value representing a light quantity of the optical packet outputted from the output port 341 of the first channel and the output level specification values (upper limit value and lower limit value) are compared, and the high level abnormality, normality and low level abnormality are determined.

In the next optical level measurement duration C, by the enable signals, a path equivalent to that in the optical level measurement duration A is formed and an abnormality determination equivalent to that in the optical level measurement duration A is performed. Further, in the next optical level measurement duration D, by the enable signals, a path equivalent to that in the optical level measurement duration B is formed and an abnormality determination equivalent to that in the optical level measurement duration B is performed.

Here, an association between the pass timing of the optical packet in the output port of the first channel and the abnormality determination is explained above, and a similar explanation is applied to the output port of the second channel.

Figure 6:
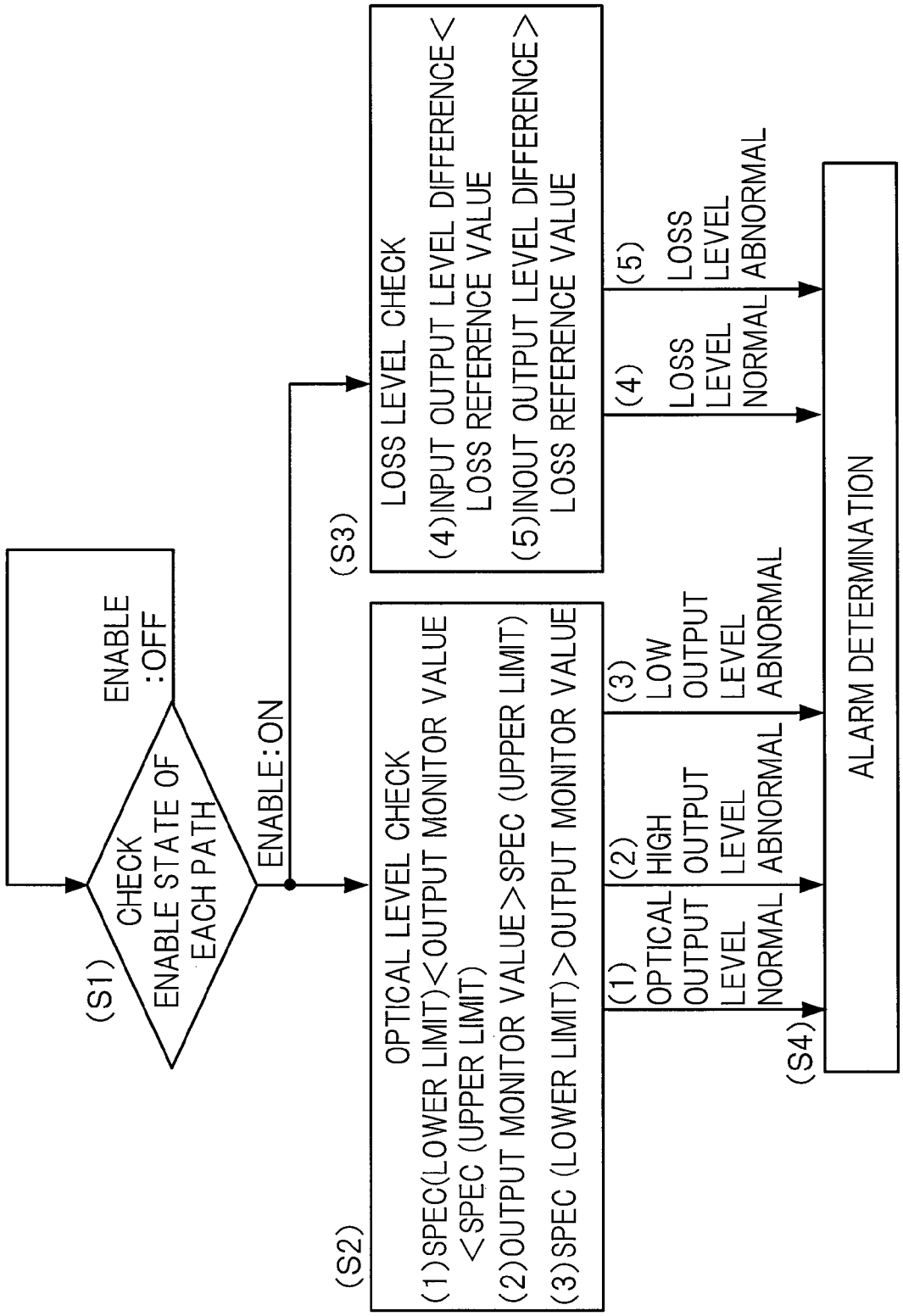
FIG. 6 is a flow chart illustrating a flow of the processes in the output level abnormality/device abnormality recognizing section (OLADARS) illustrated in FIG. 4.

FIG. 6 is a flow chart illustrating a flow of the processes in the output level abnormality/device abnormality recognizing section (OLADARS) illustrated in FIG. 4.

In the enable timing check section 5181, an enable state of each path through which the optical packet of the optical switch circuit (OSC) 31 (see FIGS. 2 and 3) passes is checked based on the enable signal, and when enable is on, that is, a certain path is formed, proceeding to step S2, S3.

In step S2, in the output level monitor circuit section (OLMCS) 5183, with respect to an output port corresponding to a current enable on, the output monitor value and the output level specification values (upper limit value and lower limit value) are compared:
  when
  (1) the specification value (lower limit value)<the output monitor values<the specification values (upper limit value),
  it is determined that the optical output level is in normality;
  when
  (2) the output monitor values>the specification value (upper limit value),
  it is determined to be in a high output level abnormality; and
  when
  (3) the specification value (lower limit value)<the output monitor values,
  it is determined to be in a low output level abnormality.

In addition, in the input output level difference check section 5182, with respect to a combination of input port-output port associated with a current enable-on, a difference between the input monitor value and the output monitor values is obtained and an input output level difference which is the difference is compared with the loss reference value:
when
(4) the input-output level difference<the loss level reference value,
it is determined to be in a loss level normality; and
when
(5) the input output level difference>the loss level reference value,
it is determined to be in a loss level abnormality.

When the normality-abnormality is determined in step S2, S3, the determination results are informed to the alarm determination section 5184. In the alarm determination section 5184, the determination results are considered in a comprehensive manner and the alarm determination is performed according to an alarm determination table illustrate in table 1 described below. The alarm determination results are inputted to the center section 30 illustrated in FIG. 3, and recording the alarm determination results and outputting an alarm are performed by the center section 60.

TABLE 1

Alarm Determination Table
Alarm Determination

|  |  | Loss level check | |
| --- | --- | --- | --- |
|  |  | Loss level normal | Loss level abnormal |
| Optical output level check | Optical output level normal | Device normal Detection circuit normal | Device abnormal Detection circuit normal |
|  | High output level abnormal | Device normal Detection circuit abnormal | Device normal Detection circuit abnormal |
|  | Low output level abnormal | Device normal Detection circuit normal | Device abnormal Detection circuit normal |

Figure 7:
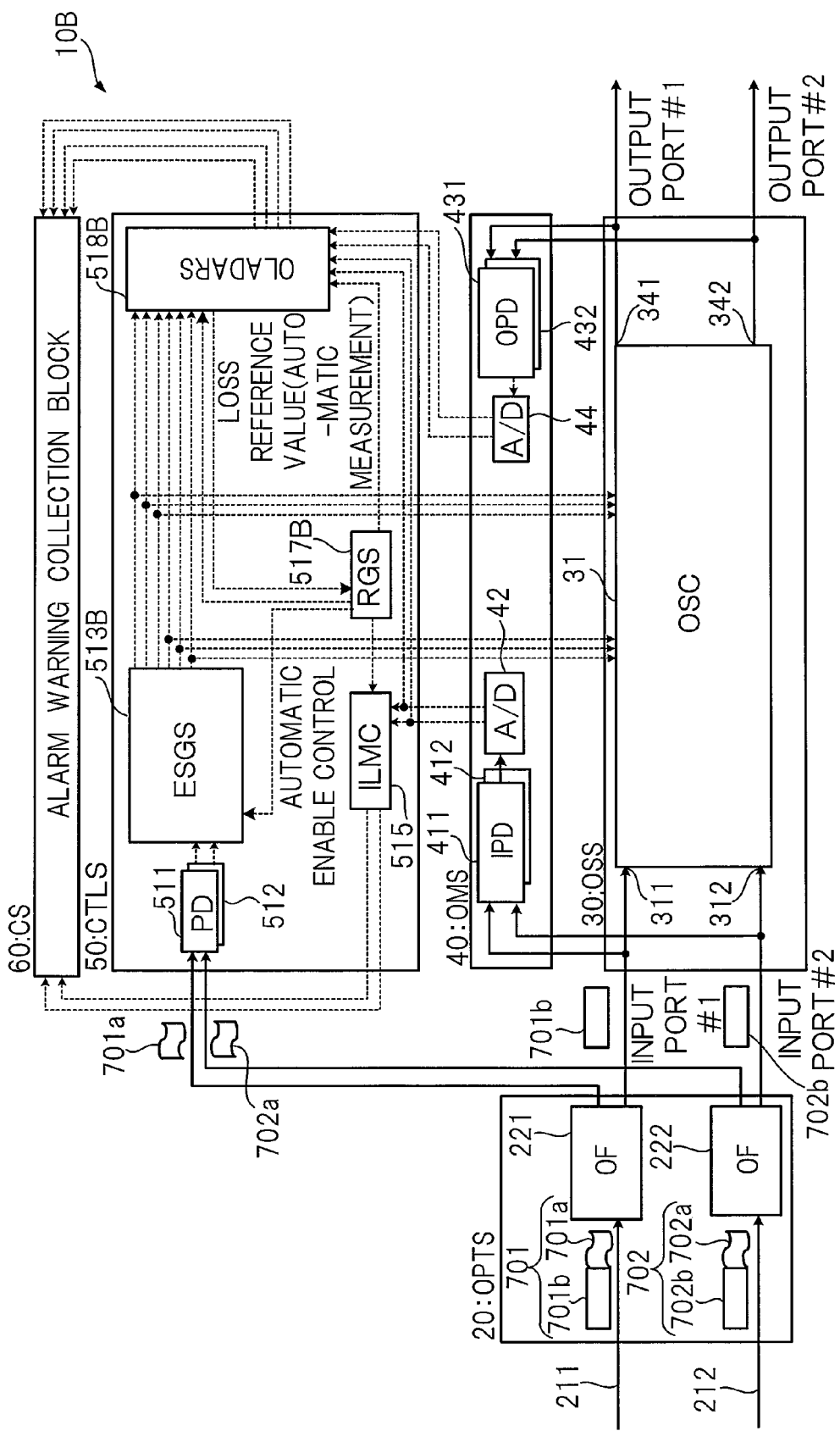
FIG. 7 is a block diagram illustrating a second embodiment of the optical packet switching apparatus according to the invention.

FIG. 7 is a block diagram illustrating a second embodiment of the optical packet switching apparatus according to the invention. Elements same as those in the optical packet switching apparatus 10A of the first embodiment illustrated in FIG. 3 are provided the same references as those illustrated in FIG. 3.

The optical packet switching apparatus 10B of the second embodiment has a feature in a center section 50B. After the system is started up, an automatic enable control signal from a register section (RGS) 517B included in the control section (CTLS) 50B to an enable signal generating section 513B turns on.

When the automatic enable control signal turns on, in the enable signal generating section 513B, regardless of a destination address of the header of the optical packet, the enable signal is automatically generated in a fixed pattern. In this time, dummy optical packets are to be continuously inputted.

Figure 8:
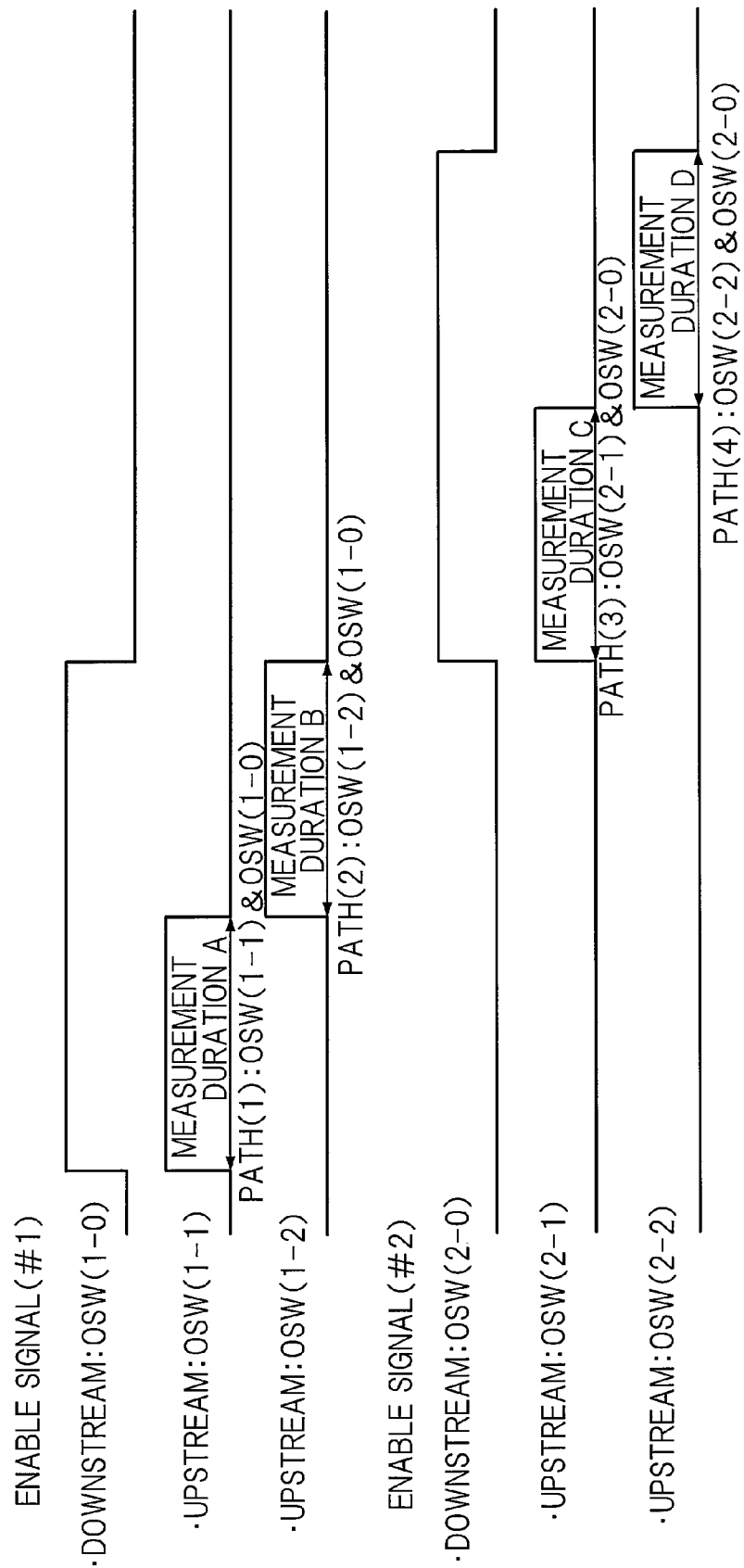

FIG. 8 illustrates a timing chart at the time when an automatic enable control signal is on.

When the automatic enable control signal turns on, in the enable signal generating section 513B, an optical switch (OSW) 331_4 (downstream: optical SW(1-0)) on the downstream side of the optical switch module 331 of the first channel illustrated in FIG. 2 is turned on, and at the same time, an enable signal to turn on one optical switch (OSW) 331_1 (upstream: optical SW(1-1)) on the upstream side of the optical switch module 331 of the first channel is generated. At this time, the other optical switch (OSW) 331_2(upstream: optical SW(1-2)) on the upstream side and each of the optical switches (OSW) 332_4, 332_1, 332_2 (downstream: optical SW(2-0), upstream: optical SW(2-1), upstream: optical SW(2-2)) remain off. As described above, in the measurement duration A, a path(1) where the optical packet inputted from the input port 331 of the first channel is outputted from the output port 341 of the first channel is formed. In the output level abnormality/device abnormality recognizing section (OLADARS) 518B, in the measurement duration A, a difference between the input monitor value and the output monitor value of the path (1) is obtained.

Next, an enable signal is generated such that, this time, of the two optical switches on the upstream side, the optical switches (OSW) 331_1, 331_2 (upstream: optical SW(1-1), upstream: optical SW(1-2)) of the optical switch module 331 of the first channel, the one optical switch (OSW) 331_1 (upstream: optical SW(1-1) is off and the other optical switch (OSW) 331_2 (upstream: optical SW(1-2)) is on while the optical switch (OSW) 331_4 (downstream: optical SW(1-0)) on the downstream side of the optical switch module 331 of the first channel is remained on, and a path (2) where the optical packet inputted this time from the input port 312 of the second channel is outputted from the output port 341 of the first channel is formed. In the output level abnormality/device abnormality recognizing section (OLADARS) 518B, a difference between the input monitor value and the output monitor value of the path (2) in the measurement duration B is obtained.

Next, an enable signal is generated to cause the three optical switches (OSW) 331_1, 331_2, 331 4 (downstream: optical SW(1-0), upstream: optical SW(1-1), upstream: optical SW(1-2)) of the first channel all to be on, and this time, to cause the optical switch (OSW) 332_4 (downstream: optical SW(2-0)) on the downstream side of the optical switch module 332 of the second channel to be on and at the same time to cause the one optical switch (OSW) 332_1 (upstream: optical SW(2-1)) of the optical switch module 332 of the second channel to be on. At this time, the other optical switch (OSW) 332_2 (upstream: optical SW(2-2)) remains off. As described above, in the measurement duration C, a path (3) where the optical packet inputted from the input port 331 of the first channel is outputted from the output port 342 of the second channel is formed, and in the output level abnormality/device abnormality recognizing section (OLADARS) 518B, a difference between the monitor value and the output monitor value of the path (3) is obtained in the measurement duration C.

Further, next, an enable signal is generated such that, of the two optical switches (OSW) 332_1, 332_2 (upstream: optical SW(2-1), upstream: optical SW(2-2)) on the upstream side of the optical switch module 332 of the second channel, this time, the optical switch (OSW) 332_1 (upstream: optical SW(2-1) is off and the other optical switch (OSW) 332_2 (upstream: optical SW(2-2) is on, while the optical switch (OSW) 332_4 (downstream: optical SW(2-0) on the downstream side of the optical switch module 332 of the second channel remains off, and this time, a path (4) where the optical packet inputted from the input port 312 of the second channel is outputted from the output port 342 of the second channel. In the output level abnormality/device abnormality recognizing section (OLADARS) 518B, a difference between the input monitor value and the output monitor value of the path (4) is obtained in the measurement duration D.

In the output level abnormality/device abnormality recognizing section (OLADARS) 518B after calculating these all differences is performed, a loss reference value is obtained by, for example, adding further a margin on a maximum difference value of the difference values. This obtained loss reference value is stored in the register section (RGS) 517B.

In the optical packet switching apparatus 10B of the second embodiment illustrated in FIG. 7, as described above, the loss reference value is obtained at the time when the system is started up. Note that the input level specification values (upper limit vale and lower limit value) and the output level specification values (upper limit vale and lower limit value) are predetermined values, and the predetermined values are stored in the register section (RGS) 517B in advance.

Operations of the enable signal generating section 513B, the register section (RGS) 517B and the output level abnormality/device abnormality recognizing section (OLADARS) 518B are equivalent to the respective operations of the enable signal generating section 513, the register section (RGS) 517 and the output level abnormality/device abnormality recognizing section (OLADARS) 518 in the first embodiment illustrate in FIG. 3.

Figure 9:
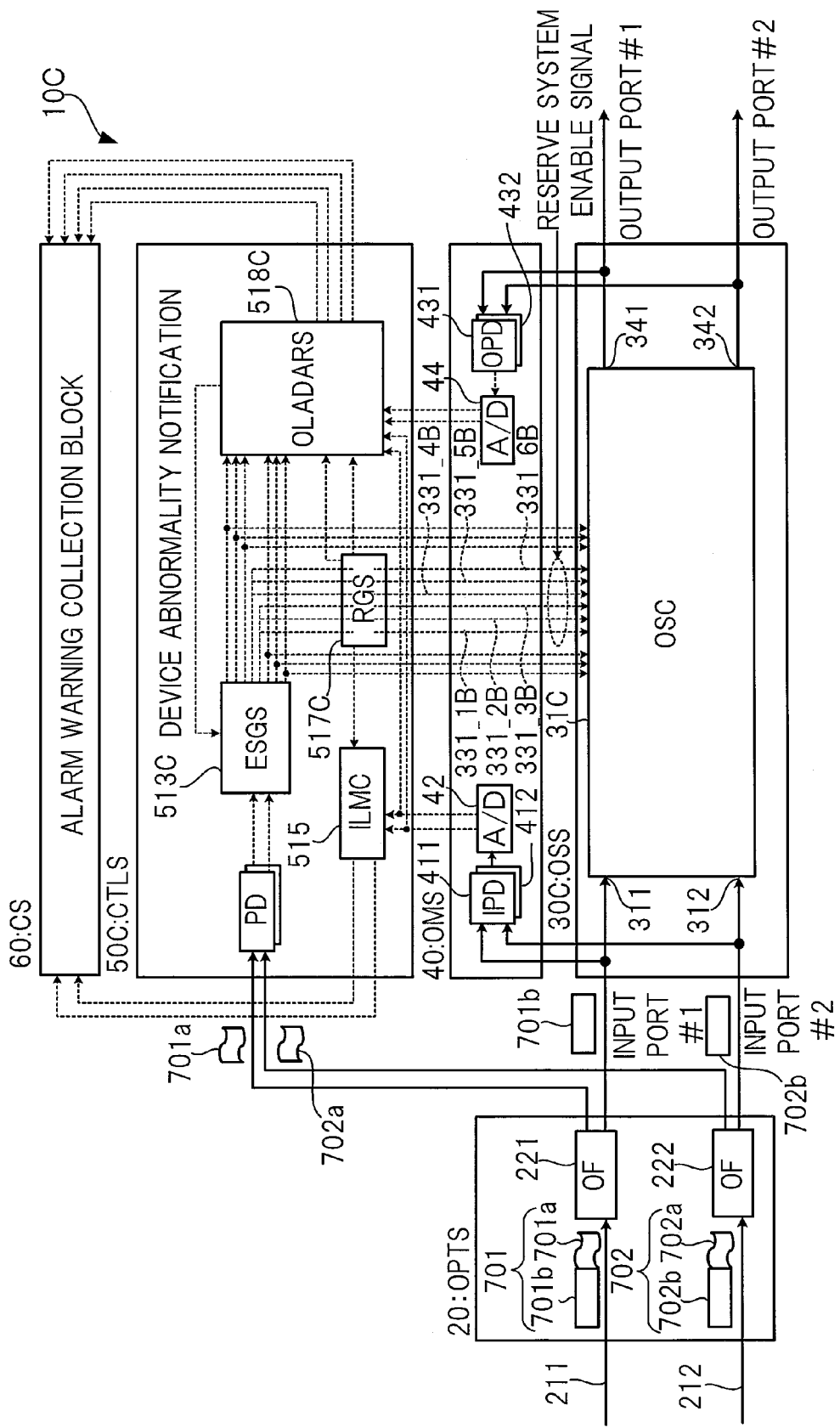
FIG. 9 is a block diagram illustrating a third embodiment of the optical packet switching apparatus according to the invention.
Figure 10:
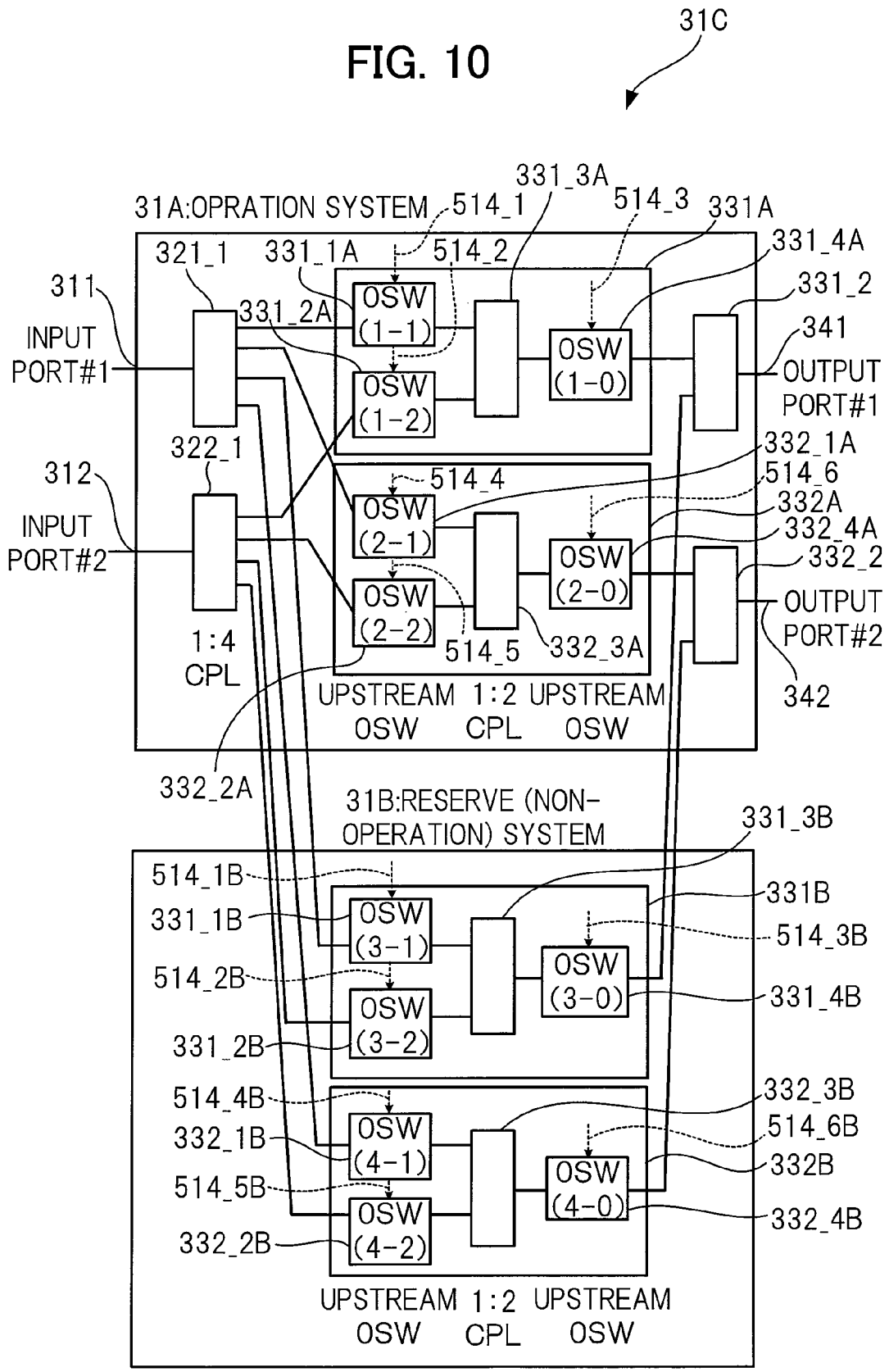
FIG. 10 is a block diagram illustrating a configuration of the optical switching circuit in the third embodiment illustrated in FIG. 9.

FIG. 9 is a block diagram illustrating a third embodiment of the optical packet switching apparatus according to the invention. FIG. 10 is a block diagram illustrating a configuration of the optical switching circuit in the third embodiment illustrated in FIG. 9.

Elements same as those of the optical packet switching apparatus 10A of the first embodiment described above (FIG. 3) are provided with the same references as those illustrated in FIG. 3

First, an optical switching circuit illustrated in FIG. 10 will be explained.

An optical switching circuit 31C provided in an optical switching section 30C of an optical packet switching apparatus 10C of the third embodiment illustrated in FIG. 9 includes a system in operation 31A and a reserve (non-operation) system 31B.

Comparing to the optical switching circuit 31 illustrated in FIG. 2, with respect to the system in operation 31A of the optical switching circuit (OSC) 31C illustrated in FIG. 10, the two photo coupler 321, 332 on the input side are to divide each of the optical packets each inputted from the input ports 311, 312, respectively into two pieces in the optical switching circuit (OSC) 31 illustrated in FIG. 2, and in contrast, the photo couplers 321_1, 322_1 on the input side of the system in operation 31A illustrated in FIG. 10 are to divide each of the optical packets inputted from the input ports 311, 312, respectively into four pieces. In addition, the system in operation 31A is provided with two photo couplers 331_2, 332_2 to merge the optical packets outputted from the two optical switch modules 331A, 332A of the system in operation 31A with the optical packets outputted from the two optical modules 331B, 332B of the reserve (non-operation) system 31B, respectively.

Internal configuration of each of the optical modules 331A, 332A; 331B, 332B is equivalent to that of each of the optical modules 331, 332, and since the operation is explained already with reference to FIG. 2, only relations of the respective elements will be described.

The optical switches (OSW) 331_1A, 331_2A, 331_4A and the photo coupler 331_3A of the optical switch module 331 A of the system in operation 31A correspond to the optical switches (OSW) 331_1, 331_2, 331_4 and the photo coupler 331_3, respectively. And, similar to this, the optical switches (OSW) 332_1A, 332_2A, 332_4A and the photo coupler 332_3A of the optical switch module 332A of the system in operation 31A correspond to the optical switches (OSW) 332_1, 332_2, 332_4 and the photo coupler 332_3 of the optical module 332, respectively.

In addition, the reserve (non-operation) system 31B is similar to the system in operation 31A. The optical switches (OSW) 331_1B, 331_2B, 331_4B and the photo coupler 331_3B of the optical switch module 331B of the reserve (non-operation) system 31B correspond to the optical switches (OSW) 331_1, 331_2, 331_4 and the photo coupler 331_3 of the optical module 331 in FIG. 2, respectively. And, similar to this, the 332_1B, 332_2B, 332_4B and the photo coupler 332_3B of the optical switch module 332B of the reserve (non-operation) system 31B correspond to the optical switches (OSW) 332_1, 332_2, 332_4 and the photo coupler 332_3 of the optical module 332 in FIG. 2, respectively.

Returning to FIG. 9, the optical packet switching apparatus 10C of the third embodiment will be explained.

Six signal transmission lines 514_1, 514_2, 514_3, 514_4, 514_5, 514_6 to transmit the enable signal for on-off control of the optical switches (OSW) 331_1A, 331_2A, 331_4A; 332_1A, 332_2A, 332_4A of the system in operation 31A illustrated in FIG. 10 similar to the six transmission lines in the first embodiment illustrated in FIG. 3 are connected to the enable signal generating section 513C, and in addition, six signal transmission lines 514_1B, 514_2B, 514_3B, 514_4B, 514_5B, 514_6B to transmit the enable signal for on and off control of the optical switches (OSW) 331_1B, 331_2B, 331_4B; 332_1B, 332_2B, 332 4B of the system in operation 31B are connected to the enable signal generating section 513C.

In the optical packet switching apparatus 10C, in the normal state, only the system in operation 31A of the optical switching circuit (OSC) 31C is used. Up to this stage, the optical packet switching apparatus 10C is similar to the optical packet switching apparatus 10A of the first embodiment illustrated in FIG. 3. When an abnormality is detected in the output level abnormality/device abnormality recognizing section (OLADARS) 518C, the fact that the device abnormality is detected is informed to the enable signal generation section (ESGS) 513C. The enable signal generation section (ESGS) 513C turns off all of the optical switches of the system in operation 31A, and sends the enable signal to the reserve (non-operation) system 31B to cause the (non-operation) system 31B to operate substituting the operations operated by the system in operation 31 until that time.

Thus, it is possible to immediately recover the operations even if a device abnormality occurs in the optical packet switching apparatus 10C.

FIG. 11 is a block diagram illustrating an optical switching circuit including more multiple channels than the optical switching circuits described above.

An optical switching circuit (OSC) 31D illustrated in FIG. 11 includes eight input ports and eight output ports, and is provided in the input side with eight photo couplers 3210 which divide an inputted optical packet into eight pieces to send each to each of the optical modules, respectively, and, further, in the downstream side with eight optical switch modules 3310. Each of the optical switch modules 3310 includes in the input side eight optical switches on the upstream side, and is arranged with one optical coupler 3312 to merge eight inputs into one line on the downstream side of the optical switch modules 3310, and further, on the downstream side thereof, with one optical switch 3313 of the downstream side. These all optical switches are switched on or off by the enable signals generated according to a destination of the optical packet in the enable signal generating section (see, for example, the enable signal generation section (ESGS) 513).

Although, the structure of the optical switching circuit (OSC) 31D illustrated in FIG. 11 is complicated, since its operation may be easily understood from the operation explanation of the optical switching circuit (OSC) 31 illustrated in FIG. 2, a redundant explanation will be saved here.

When the optical switching circuit (OSC) 31D in FIG. 11 is employed, for example, all the constituent elements of the optical packet switching apparatus 10A illustrated in FIG. 3 need to be expanded for eight channels. However, since it is to simply expand the number of channels, and the operations are apparent from the explanation of the optical packet switching apparatus 10A in FIG. 3 and like, an explanation about this point is also saved.

The present invention may be applied to an optical packet switching apparatus including more, as illustrated in FIG. 11, or further more multi channel input and output lines.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical packet switching apparatus, comprising:
    an optical switching section that includes an optical switch to switch a path of an optical packet according to an electrical switch control signal, switches the path of the optical packet transmitted thereto according to the switch control signal to output the optical packet;
    a control section that takes out a header portion representing a destination of the optical packet transmitted thereto, photoelectrically converts the header to generate the switch control signal according to the destination so as to transmit the switch control signal to the optical switching section, and controls the optical switch;
    a light monitor section that monitors a first light quantity level which is a light quantity level of the optical packet transmitted thereto and a second light quantity level which is a light quantity level of the optical packet to be sent out; and
    an abnormality recognizing section that recognizes an effective timing of monitoring of the first light quantity level and the second light quantity level based on the switching control signal, and recognizes an abnormality based on the first light quantity level and the second light quantity level at the timing.

2. The optical packet switching apparatus according to claim 1, wherein the abnormality recognizing section comprises:
    an input and output level difference checking section that detects whether or not a level difference between the first light quantity level and the second light quantity level exceeds a predetermined reference loss level;
    an output level monitor section that detects whether or not the second light quantity level is within an output level of specifications, the output level including an upper limit value and a lower limit value; and
    an alarm determination section that determines whether or not there is an abnormality and what kind the abnormality is if there is the abnormality, based on a first detection result in the input and output level difference checking section and a second detection result in the output monitoring section, and outputs an alarm.

3. The optical packet switching apparatus according to claim 2, further comprising a reference setting control section that causes the control section to generate the switch control signal for monitoring which sequentially switches the path of the optical packet, and causes the alarm determination section to calculate the reference loss level.

4. The optical packet switching apparatus according to claim 1, wherein
    the optical switching section that includes a plurality of input ports to input the optical packet and a plurality of output ports to output the optical packet, and that switches a connection between the plurality of input ports and the plurality of outputs ports through a switching-on and a switching-off of the plurality of optical switches,
    the optical monitor section monitors the first light quantity lever which is the light quantity level of the optical packet inputted from each of the plurality of input ports and the second light quantity level of the optical packet outputted from each of the plurality of output ports, and detects, with respect to a plurality of combinations of the plurality of input ports and the plurality of output ports, whether or not a level difference between the first light quantity level and the second light quantity level exceeds a predetermined reference loss level,
    the output level monitor section detects, with respect to the optical packet outputted from each of the plurality of output ports, whether or not the second light quantity level is within the output level of specifications, and
    the alarm determination section integrates a detection result in the plurality of combinations of the input ports and output ports in the input and output level difference checking section and a detection result in the plurality of output ports in the output level monitoring section, and determines whether or not there is an abnormality and what kind of the abnormality is to output an alarm.

5. The optical packet switching apparatus according to claim 1, wherein the optical switching section includes a first optical switching section to be applied for an actual operation and a reserve second optical switching section to be used instead of the first switching section if the abnormality of the first optical switching section is detected by the alarm determination section.

* * * * *